United States Patent [19]
Schuil

[11] 3,931,042
[45] Jan. 6, 1976

[54] CATHODOCHROMIC SODALITE
[75] Inventor: Roelof Egbert Schuil, Eindhoven, Netherlands
[73] Assignee: U.S. Philips Corporation, New York, N.Y.
[22] Filed: June 20, 1973
[21] Appl. No.: 371,717

[30] Foreign Application Priority Data
June 27, 1972 Netherlands.................... 7208817

[52] U.S. Cl............. 252/300; 252/301.4 F; 313/465
[51] Int. Cl.²............................................ F21V 9/00
[58] Field of Search...... 252/300, 301.4 F; 250/474, 250/472; 313/465

[56] References Cited
UNITED STATES PATENTS

| | | | |
|---|---|---|---|
| 2,752,521 | 6/1956 | Ivey | 313/91 |
| 2,761,846 | 9/1956 | Medved | 252/301.4 F |
| 3,598,750 | 8/1971 | Phillips | 252/300 |
| 3,705,323 | 12/1972 | Shidlovsky | 252/300 |
| 3,773,540 | 11/1973 | Shidlovsky | 252/300 |

OTHER PUBLICATIONS

Heyman; P. M., Istvan Gorag, and Brian Faughnan, "High Contrast Thermal–Erase Cathodochromic Sodalite Storage–Display Tubes," IEEE Trans Electron Devices, 1971, 18(9), pp. 685–691.

*Primary Examiner*—Benjamin R. Padgett
*Assistant Examiner*—Deborah L. Kyle
*Attorney, Agent, or Firm*—Frank R. Trifari; Norman N. Spain

[57] ABSTRACT

A cathodochromic sodalite defined by the formula $Na_3Al_3Si_3O_{12} \cdot NaX$ (X = Cl, Br or J) comprising at least one of the elements tin, lead and germanium in a quantity of between 0.05 and 2 atom % calculated with respect to silicon. The addition of the said elements results in an improvement of the reversible bleaching properties. Notably, a faster and also a more complete bleaching is obtained.

7 Claims, No Drawings

CATHODOCHROMIC SODALITE

The invention relates to a cathodochromic sodalite defined by the formula $Na_3Al_3Si_3O_{12}.NaX$ in which X represents at least one of the halogen chrorine, bromine and iodine. Furthermore, the invention relates to a cathode-ray tube provided with a display screen comprising such a cathodochromic sodalite and to a method of manufacturing such a cathodochromic sodalite.

Materials exhibiting a dark discolouration under irradiation are referred to as scotophors. When the material is discoloured under the influence of electromagnetic radiation, frequently ultraviolet radiation, it is a so-called photochromic material. Materials which discolour under electron bombardment are cathodochromic materials. Cathodochromic materials may be advantageously used in the display screen of cathode-ray tubes if it is desirable that the information displayed by the tube remains available for the user during a comparatively long period, for example, in monitor tubes, radar tubes and oscilloscope tubes. In such tubes, an image which is rich in contrast is obtained and it consists of a dark track on a light background, which image is maintained for a comparatively long period after discontinuation of the electron bombardment. The image may be observed without any difficulty in a brightly lit environment, for example, in daylight. Erasion of the image is possible by heating the cathodochromic material or by irradiating the material with radiation having suitable wavelengths.

Known scotophors are hackmanite which is a mineral occurring in nature and synthetic hackmanite or sodalite. The mineral sodalite is more or less permanently discoloured. The use of natural hackmanite and of synthetic sodalite in cathode-ray tubes is known from U.S. Pat. No. 2,752,521. The nautural hackmanite, which is comparatively rare, has the drawback of being contaminated so that the cathodochromic properties are deleteriously influenced and unreproducible results are obtained when they are used in tubes.

A method of manufacturing sodalite is known from U.S. Pat. No. 2,761,846 in which use is made of a solid-state reaction at a high temperature. The starting mixture is a mixture of powder comprising sodium hydroxide, aluminium oxide, silicon dioxide and sodium chloride in quantities corresponding to the formula $Na_3Al_3Si_3O_{12}.NaCl$ for chlorine sodalite. The mixture furthermore preferably comprises an excess of silicon dioxide and a quantity of sodium carbonate.

United Kingdom Patent Specification No. 1,187,982 describes a method of manufacturing sodalites which comprise a quantity of sulphur. The presence of an activating quantity of sulphur is found to be necessary for obtaining satisfactory photochromic proporties.

The sodalites manufactured in accordance with the above-mentioned known methods generally have satisfactory photochromic properties. For use in cathode-ray tubes they are, however, unsuitable, because they exhibit no or only a slight discolouration under cathode rays, which discolouration is in addition poorly erasable.

Netherlands Patent Application No. 7204203 proposes a method of manufacturing cathodochromic sodalite in which sodium halide and furthermore silicon dioxide are added to a solution comprising sodium aluminate, whereafter the suspension obtained is dried and the product obtained in subsequently heated at a temperature below the melting point of sodalite. It has been found that very pure materials must be used as starting materials if sodalites having satisfactory cathodochromic properties are to be obtained. Notably the presence of sulphur necessary for obtaining satisfactory photochromic properties is to be avoided.

The object of the invention is to provide a cathodochromic sodalite having improved reversible bleaching properties, that is to say, the sodalite discoloured under cathode rays can be bleached faster and more completely by irradiation with light.

According to the invention, a cathodochromic sodalite is defined by the formula $Na_3Al_3Si_3O_{12}.NaX$ in which X represents at least one of the halogen chlorine, bromine and iodine and is characterized in that the sodalite comprises at least one of the elements tin, lead and germanium in a quantity of between 0.05 and 2 atom % calculated with respect to silicon.

It has been surprisingly found that the elements tin, lead and germanium in the above-mentioned quantities considerably enhance the reversible bleaching properties of sodalite without deleteriously influencing the other properties of the sodalite. A sodalite according to the invention is substantially as white as the known sodalites which do not contain tin, lead or germanium and thus does not shown any initial discolouration. Furthermore, the sodalite is found to discolour as deeply as the known sodalites under cathode rays especially when using the elements tin and lead. Bleaching of a discoloured sodalite according to the invention by means of irradiation with light is effected at a considerably faster rate than in the case of the known sodalites. The time required for reversibale bleaching of a sodalite according to the invention, which is discoloured by cathode rays, until a given final density is obtained is found to be approximately half the time required to obtain the same final density under the same circumstances with a sodalite not containing any tin, lead or germanium, as will be proved hereinafter. The sodalites according to the invention have the additional advantage that they can be reversibly bleached in a more complete manner, that is to say they can be made substantially as white by irradiation with light as the freshly prepared undiscoloured sodalite.

The elements tin, lead and germanium may be added to the starting materials as such in the required quantities for the manufacture of the cathodochromic sodalites according to the invention. It is alternatively possible to add these elements in the form of compounds, for example, oxides or chlorides.

The quantity of at least one of the elements tin, lead and germanium is preferably chosen in a sodalite according to the invention between 0.1 and 1 atom % calculated with respect to silicon, for optimum results are then obtained.

A sodalite according to the invention comprising tin and/or lead is preferred because images which are richest in contrast are obtained when using such a sodalite in a cathode-ray tube. Experiments have shown that when using the element germanium, sodalites are obtained which discolour slightly less deeply under cathode rays than the tin and for lead-containing sodalites.

Optimum results as regards completeness and rate of reversible bleaching are obtained with the tin-containing sodalites according to the invention. These sodalites are therefore preferred.

In an advantageous embodiment of a sodalite according to the invention, the halogen denoted by X is bromine. In fact, bromine sodalite is found to exhibit the greatest density under cathode rays. The large extent of density obtained with bromine sodalite is a result on the one hand of the great sensitivity of bromine sodalite and on the other hand a result of the location of the reflection curve of the discoloured bromine sodalite. In fact, this curve is found to be substantially complementary with the eye sensitivity curve.

In the manufacture of a sodalite according to the invention, a method is preferably used which is characterized in that a solution is made which comprises sodium aluminate ($NaAlO_2$), at least 0.33 mol of sodium halide (NaX) per mol of $NaAlO_2$ and furthermore at least one of the elements tin, lead and germanium in a quantity of between 0.0005 and 0.02 mol per mol of $NaAlO_2$, silicon dioxide being added to said solution in a quantity of between 0.90 and 1.10 mol per mol of $NalO_2$, the suspension obtained being dried and the product thus obtained being heated at a temperature below the melting point of sodalite and the heating product being washed with water. It is advantageous to mix the heating product with 5 to 200 % by weight of NaX and to subject it subsequently to a second heat treatment at a temperature below the melting point of sodalite whereafter the product is finally washed with water. The above-described method is completley analogous to that described in Netherlands Patent Application No. 7204203.

The invention will now be described in greater detail with reference to a number of examples and measurements.

EXAMPLE 1

1.6 grams of NaCH (pro analysis) are dissolved in 5 mls water in a polythene breaker. Subsequently, 0.73 gram of aluminium (99.99%) is dissolved in the lye. 10.2 mgs of $SnO_2$ are added to the solution. Subsequently, 11.2 mls of HBr (pro analysis: comprises 0.80 gram HBr) are added drop-wise. Finally, 1.66 grams of $SiO_2$ (water content 2.34% by weight) are added to the solution and the suspension thus obtained is homogenized by stirring. The suspension is subsequently evaporated to dryness in a vacuum drying stove at 80°C. The product is then heated in air for 2 hours in an alundum crucible at 1100°C. After cooling, the firing product is mixed with 100% by weight of NaBr and once more heated in air for 2 hours at 1,100°C. After cooling, the product obtained is pulverised, washed with water and dried. The product obtained consists of bromine sodalite as is apparent from X-ray diffraction analysis. It contains 0.25 at. % of tin calculated with respect to silicon.

EXAMPLE 2

In a manner completely analogous to that as described in example 1, a bromine sodalite is manufactured which comprises 0.25 atom % of lead (with respect to silicon). 18.9 mgs of $PbCl_2$ instead of the tin oxide applied in example 1 are used.

EXAMPLE 3

In order to obtain a bromine sodalite comprising 0.25 atom % of germanium (calculated with respect to silicon), the same procedure is used as in example 1. Instead of the tin oxide used in example 1, 7.11 mgs of germanium oxide are added to the solution.

A number of measurements whose results are summarized in the table were performed on the sodalites manufactured in accordance with the above-mentioned examples.

TABLE

| Example | Addition | not discoloured | Reflection in % discoloured | reversible bleached | $t_{60}$ in sec. |
|---|---|---|---|---|---|
| a | — | 96 | 28 | 87 | 400 |
| 1 | 0.25 at.% Sn | 94 | 33 | 91 | 210 |
| 2 | 0.25 at.% Pb | 94 | 32 | 87 | 200 |
| 3 | 0.25 at.% Ge | 97 | 38 | 88 | 140 |

The table states for each example the reflection in % measured relative to a magnesium oxide standard. For the purpose of comparison, example *a* states the result of measurements of a known sodalite not containing tin, lead or germanium and prepared in a manner completely analogous to that in the above-mentioned example 1. The column "not discoloured" shows the reflection of the freshly prepared sodalite powder. The measurements show that the sodalites according to the invention are as white as the known sodalite. The column "discoloured" shows the reflection values of the sodalite discoloured by cathode rays under standard circumstances (electron bombardment at an energy of approximately 5keV for 10 seconds). It is readily evident that the sodalites according to the invention according to examples 1 and 2 substantially discolour as deeply as the known sodalite. For the sodalite according to example 3, this is the case to a slightly lesser extent. The column "reversely bleached" shows the reflection of the sodalites if they are subjected to a reversible bleaching treatment under standard circumstances (the same light intensity and the same time of exposure to light). It is found that reversible bleaching especially in the case of example 1 (Sn) takes place very completely. In the last column the duration of time is stated in seconds under the heading $t_{60}$ which is necessary for each example so as to reversibly bleach the sodalite upon exposure to light having a light intensity of 500 Lx until a reflection of 60% of the freely prepared sodalite is achieved. It is clear that bleaching of the sodalites according to the invention is effected at a rate which is twice as fast as in the case of the known sodalite.

What is claimed is:

1. A cathodochromic sodalite defined by the formula $Na_3Al_3Si_3O_{12}.NaX$ in which X represents at least one halogen selected from the group consisting of chlorine, bromine and iodine, wherein the sodalite contains at least one element selected from the group consisting of tin, lead and germanium in a quantity of between 0.05 and 2 atom % calculated with respect to silicon.

2. A cathodochromic sodalite as claimed in claim 1, wherein the said quantity has a value of between 0.1 and 1 atom %.

3. A cathodochromic sodalite as claimed in claim 1 wherein the sodalite contains at least one element selected from the group consisting of tin and lead.

4. A cathodochromic sodalite as claimed in claim 3, wherein the sodalite contains tin.

5. A cathodochromic sodalite as claimed in claim 1, wherein X is bromine.

6. A cathode-ray tube provided with an image screen comprising a cathodochromic sodalite as claimed in claim 1.

7. A method of manufacturing a cathodochromic sodalite of claim 1 comprising forming an aqueous solution of sodium aluminate ($NaAlO_2$), at least 0.33 mol of sodium halide (naX) per mol of NaAlO2, at 0.0005 to 0.02 mol per mol of $NaAlO_2$ of at least one element selected from the group consisting of tin, lead and germanium and 0.90 to 1.10 per mol of $NaAlO_2$ of silicon dioxide, drying said solution, heating said resultant dried product below the melting point of the sodalite and washing said heated product with water.

* * * * *